United States [11] 3,603,140

| | | |
|---|---|---|
| [72] | Inventor | Richard B. <br> Phoenix, Ariz. |
| [21] | Appl. No. | 791,283 |
| [22] | Filed | Jan. 15, 1969 |
| [45] | Patented | Sept. 7, 1971 |
| [73] | Assignee | Sperry Rand Corporation |

[54] GRAPHIC VIBRATION RESOLVER
6 Claims, 5 Drawing Figs.

[52] U.S. Cl. .................................................. 73/71.4,
324/77 A
[51] Int. Cl. .......................................... G01m 7/00,
G01r 23/00
[50] Field of Search............................................73/67, 67.2,
71.4, 116, 462; 324/77 A; 328/135, 150

[56] References Cited
UNITED STATES PATENTS
3,018,439   1/1962   Burrow................... 73/67.2 X
3,376,733   4/1968   Trimble.................... 73/71.4

Primary Examiner—Richard C. Queisser
Assistant Examiner—C. E. Snee, III
Attorney—S. C. Yeaton ABSTRACT: A graphic vibration resolver for rotating machinery including a programmable wave analyzer, a graphic X-Y plotter, and control electronics that provides an X-Y plot of vibration amplitude versus the gear ratio between a component of interest and a reference machine speed as measured by, for example, a tachometer (Tach Ratio). The present invention provides that a peak for a particular component of interest always occurs at the same X-axis location on the resulting plot regardless of speed changes of the machine being analyzed.

INVENTOR
RICHARD B. SPENCER
BY
*H.P. Terry*
ATTORNEY

INVENTOR
RICHARD B. SPENCER
BY
H P Terry
ATTORNEY

GRAPHIC VIBRATION RESOLVER

BACKGROUND OF THE INVENTION

Field of the Invention

The invention pertains to vibration analyzer equipment and more particularly to graphic vibration analyzer equipment providing an X-Y plot of vibration versus tach ratio, i.e., the gear ratio between a component of interest and its reference tachometer.

2. Description of the Prior Art

Generally prior art vibration analyzer apparatus requires interpretation of results due to undesirable speed fluctuations of the device under test. For example, when testing jet engines or gas turbines, the r.p.m. tends to fluctuate from a fixed r.p.m. due to limitations in the speed control system. This results in the recorded frequency of the component of interest being shifted from its true ratio with respect to the reference. Further, the interpretation of the results are difficult due to the introduction of different harmonics at each speed setting. In addition, the calculations may be in error by the amount of the fluctuation from the desired speed setting. Prior art devices which endeavor to overcome the aforementioned problems comprise extremely complex and expensive apparatus which lack portability.

SUMMARY OF THE INVENTION

The present invention provides a graphic vibration resolver that plots a permanent history of the vibratory condition for readily pinpointing incipient equipment failure. The present graphic vibration resolver may utilize two compact, portable units such as a vibration analyzer of the type disclosed in U.S. Pat. No. 3,277,695 of E. S. Joline entitled "Vibration Analyzer" and issued Oct. 11, 1966 to the same assignee as that of the present invention in conjunction with additional apparatus, which may be another portable unit, that consists of a dual-axis recorder comprising control electronics and an X-Y plotter with interconnections between the control electronics and the vibration analyzer. The electronics control an automatic frequency scan of the spectrum to provide the necessary drive signal to the X-Y plotter and for programming the vibration analyzer for frequency sweep. The combined apparatus is portable and can be transported and used in remote areas while providing the same quality analysis previously available only with complex equipment of considerably greater expense. Further, when the vibration is plotted as a function of the tach ratio, the engine speed can drift without introducing errors in the plot. In addition, superimposed amplitude plots of an individual rotating component can be obtained over a wide frequency range.

DESCRIPTION OF THE PREFERRED EMBODIMENT

Figure 1:
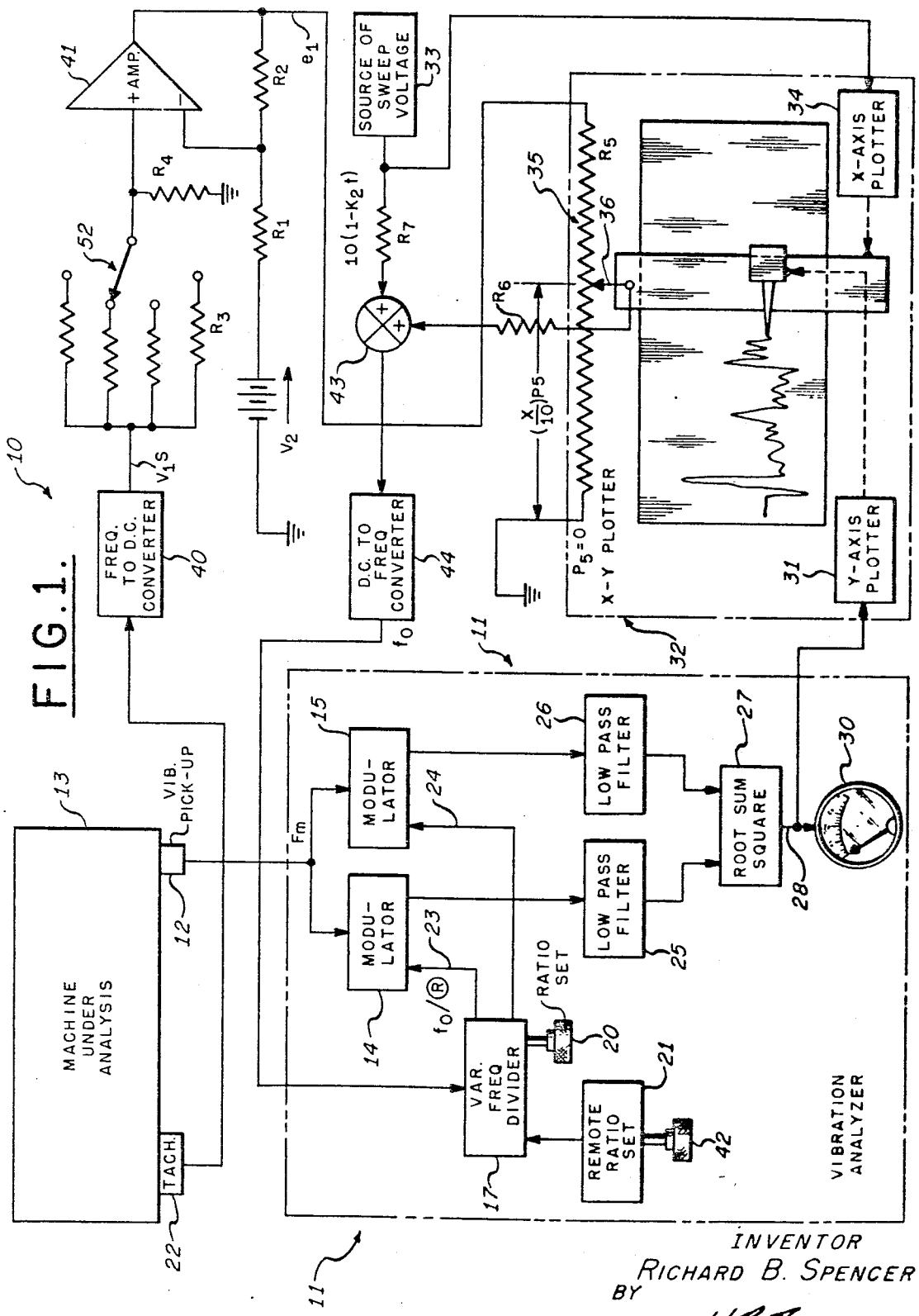
FIG. 1 is a schematic diagram partially in block form of a graphic vibration resolver incorporating the present invention.

Referring to Fig. 1, the system 10 of the present invention includes a vibration analyzer 11 such as that shown in said U.S. Pat. No. 3,277,695. The vibration analyzer 11 is responsive to signals from a vibration pickup 12 which converts the vibration of a component of the engine 13 under test to equivalent electrical signals at corresponding frequencies. The electrical signals at the output of the pickup 12 are applied jointly to modulators 14 and 15.

The divider 17 has a ratio control 20 and may also have a remote ratio control 21. The setting of the ratio control 20 is determined by the known unique ratio between the rotational frequency of the predetermined part of the engine 13 to which a tachometer generator 22 is coupled and the rotational frequency of the selected component part whose vibration characteristic is to be analyzed. The divider 17 provides a pair of signals on output lines 23 and 24 at the same frequency but in phase quadrature with respect to each other.

The quadrature signals appearing on lines 23 and 24 are applied respectively to the modulators 14 and 15. The signals at the outputs of the modulators 14 and 15 are applied to fixed-tuned low-pass filters 25 and 26 respectively. The filters 25 and 26 pass those signals at the outputs of the modulators 14 and 15 which are substantially zero frequency (direct current) and reject signals at all other frequencies. The direct current signals passed by the filters 25 and 26 are applied to a root-sum-square circuit 27 to produce on line 28 a resultant signal having an amplitude proportional to the amplitude of the desired vibration signal at the inputs of the modulators 14 and 15. The amplitude of the resultant signal appearing on line 28 may be indicated on a meter 30 and is connected to the Y-axis drive mechanism 31 of an X-Y plotter 32.

In a typical application of the present invention, an engine or gear train, exemplified by 13, contains many rotating components, each generating vibration signals, the amplitude depending on the unbalance and the frequency or the r.p.m. In a mechanical system of this type, all components which are geared together are geared to or can be connected to a reference tachometer such as 22. In engine analysis, the standard tachometer rotates at 4,200 r.p.m. at 100 percent r.p.m. The engine manufacturer defines 100 percent r.p.m. as some specific value of N1 or N2 speed such that the tachometer rotates at 4,200 r.p.m. at 100 percent speed, thus standardizing all cockpit readings for any engine.

The frequency generated by any component is related to its r.p.m. by $$F_r = \text{r.p.m.}/60 \qquad (1)$$

If $r =$ gear ratio between the component and its reference tachometer, then its tach ratio frequency is $$F_T = (4,200/60)(\text{percent r.p.m.}/100)r = 70 \cdot r \cdot S \qquad (2)$$

where $S =$ Percent Speed/100.

Since $F_T$ will vary with percent speed, it is desirable to provide compensation such that a component at tach ratio $r$ will always occur at the same X-axis location when an X-Y plot is made of vibration amplitude vs. tach ratio on a plotter 32.

The vibration analyzer such as 11 used with this system must be capable of conditioning the signal from the vibration pickup 12 and providing a DC output proportional to the component in the input signal at one frequency of interest, $F_m$, which is a function of the reference frequency, $f_o$, and the setting of the remote setting capability. The vibration analyzer of said U.S. Pat. 3,277,695 is an example of such an analyzer.

The operation of the analyzer 11 of said U.S. Pat. No. 3,277,695 is such that a DC output will be present if:

1. The frequency of interest is present in the spectrum from the vibration pickup 12.

2. The modulating frequency $F_1$, (applied to modulators 14 and 15) generated by the analyzer 11 equals the frequency of interest.

The remote setting capability of the vibration analyzer 11 of said U.S. Pat. No. 3,277,695 consists of 12 control lines, for example. The modulating frequency $F_m$ is a function of the state of these 12 lines and the control frequency, $f_o$ as $$F_m = (F/25.6 \text{ kHz.})(f_o/1.28) \qquad (3)$$

where $F$ is the decimal equivalent of the 12-bit remote ratio selection lines. Since $F$ is fixed, $f_o$ will be allowed to sweep from 17.92 kHz. to zero, thus causing $Fm$ to vary at a fixed ratio to $f_o$. This sweeping action causes a DC output from the analyzer 11 whenever $F_m$ equals some frequency in the spectrum from the vibration pickup. The DC output is connected to the plotter Y-axis drive 31.

A linear voltage sweep circuit 33 whose output voltage equals $10(1-K_2t)$ is initiated at $t=0$. This sweep voltage is connected to the X-axis drive mechanism 34 of the plotter 32 whose sensitivity is set at 1 v./inch, thus causing $$10(1-K_2t)=X \quad (4)$$

where $X$ is the distance, in inches from zero on the plotter 32. A retransmitting potentiometer 35, has its wiper 36 positioned by the X-axis driver 34 of the plotter 32 and is zeroed at $X=0$. The high side of the potentiometer 35 is connected to an amplifier 41 in a manner to be more fully explained while the wiper 36 is connected to an algebraic summing circuit 43.

The tach signal from the tachometer 22 is converted to a DC voltage proportional to percent r.p.m. in a frequency-to-DC converter 40. This signal is summed with $V_2$ in circuitry consisting of resistors $R_1$, $R_2$, $R_3$ and $R_4$ such that the output $e_1$ of the amplifier 41 equals $$e_1=\left(\frac{R_1+R_2}{R_1}\right)\left(\frac{R_4}{R_3+R_4}\right)V_1S-\frac{R_2}{R_1}V_2 \quad (5)$$

The percent r.p.m. range from 30 to 110 is divided into four parts by the percent r.p.m. switch 52 as follows:

TABLE 1

| Percent r.p.m. | Reference r.p.m. | $S_n$ | $R_3$ |
|---|---|---|---|
| 30–50 | 40 | .4 | .2$R_4$ |
| 50–70 | 60 | 0.6 | 0.8$R_4$ |
| 70–90 | 80 | 0.8 | 1.4$R_4$ |
| 90–110 | 100 | 1 | 2$R_4$ |

If $R_4$ and $R_2$ are fixed and $R_1$ is adjusted such that $$R_1=R_2\left(3\left(\frac{V_1}{V_2}\right)-1\right) \quad (6)$$

$R_3$ can be expressed as a function of $S_n$ as $$R_3=R_4[3S_n-1] \quad (7)$$

and the values of $R_3$ for the four values of $S_n$ are listed in Table 1, above. Substituting (6) and (7) into (5), $$e_1=\left[\frac{V_2}{3(V_2/V_1)-1}\right]\left[\frac{S-S_n}{S_n}\right]=V_2\left(\frac{R_2}{R_1}\right)\left(\frac{S-S_n}{S_n}\right) \quad (8)$$

The output $e_1$ of the amplifier 41 is connected to the X–Y plotter X-axis retransmitting potentiometer 35 whose total resistance, $R_5 \ll R_6$. The output from the wiper 36 to ground, $e_2$, is:

$$e_2=\left(\frac{\frac{X}{10}R_3}{R_5}\right)e_1V_2\left(\frac{R_2}{R_1}\right)\left(\frac{S-S_n}{S_n}\right)\frac{X}{10} \quad (9)$$

The signal $e_2$ along with the sweep voltage from the circuit 33 is summed through the resistors $R_6$ and $R_7$ via an algebraic summation device 43 at the input to a DC-to-frequency converter 44 such that $$f_0=K_1\left(\frac{10(1-K_2t)}{R_7}+\frac{e_2}{R_6}\right)$$

$$f_0=\frac{K_1}{R_7}\left(X+\frac{R_7V_2\left(\frac{R_2}{R_1}\right)\left(\frac{S-S_n}{S_n}\right)\left(\frac{X}{10}\right)}{R_6}\right) \quad (10)$$

The resistor $R_7$ is adjusted at $X=10$ and $S=S_n$ such that $f_0=17.92$ kc. thus $$f_0=(1.792\times 10^4)\left(X+\left(\frac{R_7(R_2/R_1)V_2}{10R_6}\right)X\left(\frac{S-S_n}{S_n}\right)\right)$$

and the resistor $R_6$ is adjusted such that $$R_7(R_2/R_1)V_2/10R_6=1$$

thus $$f_0=1.792\times 10^4\left(X+X\left(\frac{S-S_n}{S_n}\right)\right)$$

$$f_0=1.792\times 10^4 X\left(\frac{S}{S_n}\right) \quad (11)$$

Assume that the X-axis of the plotter 32 has a full-scale tach ratio calibration of R.

If a four-position switch such as 52 is used to insert the required value of 3) 3 per Table 1, the same switch or another switch 42 can be used to control the state of the remote ratio setting capability of the vibration analyzer 11 such that $$F=128RSn \quad (12)$$

Substituting (12) and (11) into (3)

$$F_m=70R\cdot S\cdot X \quad (13)$$

The component of interest will be generating a frequency, $F_T$ per (2) and when $F_m=F_T$ a peak will occur on the plot. Solving (2) and (13) for $X$ under these conditions yields $$X=r/R \quad (14)$$

indicating that a component of the tach ratio $r$ will remain fixed on the X-axis regardless of speed changes.

Figure 2:
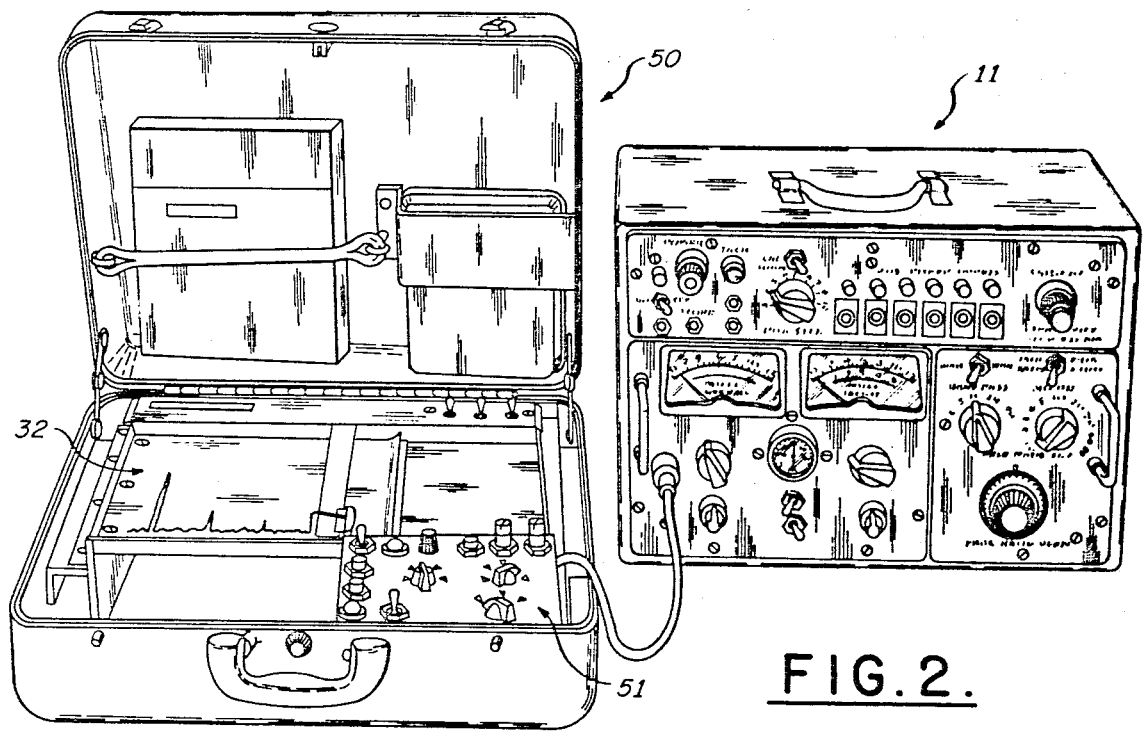
FIG. 2 is a front view of the graphic vibration resolver illustrating its portability.
Figure 3:
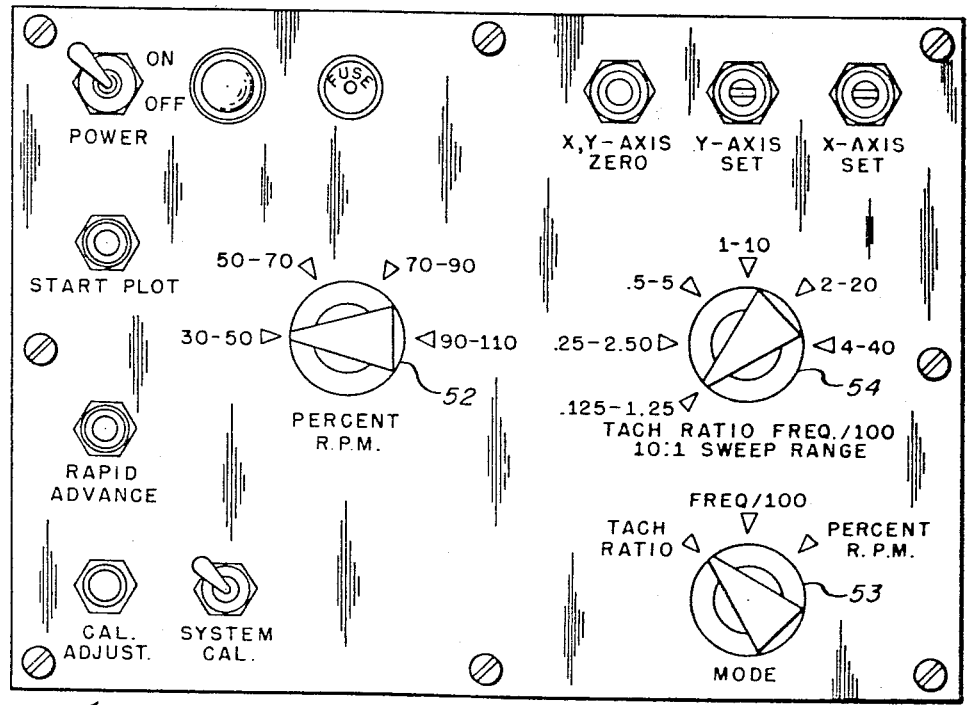
FIG. 3 is a top view of the control panel of the control electronics.

As shown in Fig. 2, the graphic vibration resolver 10 of the present invention is easily transportable comprising a compact vibration analyzer 11 interconnected with a carrying case 50 that houses the control electronics 51 and the X–Y plotter 32. The control electronics 51 contains the circuitry described above which controls an automatic frequency scan of the spectrum. It provides the necessary drive signal to the X–Y plotter 32 and programs the vibration analyzer 11 for frequency sweep. Fig. 3 shows the front panel of the control electronics unit 51.

Six overlapping 10:1 ranges of tach ratio are used which are listed below along with their approximate sweep times and bandwidths at 100 percent.

| Tach Ratio Range | Approximate Sweep Time (at 100%) | Bandwidth |
|---|---|---|
| 0.125–1.25 | 15 sec. | Narrow (1.5 c.p.s.) |
| .25–2.5 | 30 sec. | Narrow (1.5 c.p.s.) |
| .5–5 | 60 sec. | Narrow (1.5 c.p.s.) |
| 1.0–10 | 120 sec. | Narrow (1.5 c.p.s.) |
| 2.0–20 | 11 sec. | Wide (30 c.p.s.) |
| 4.0–40 | 25 sec. | Wide (30 c.p.s.) |

The percent r.p.m. range from 30–110 percent is bracketed into four ranges as set by the percent r.p.m. switch 52 on the control electronics panel of FIG. 3.

The tach ratio mode allows any component geared to the reference tachometer to appear at the same X-axis location on the resulting X–Y plot regardless of the speed thereby greatly simplifying the analysis. After placing the mode switch 53 to tach ratio and selecting the desired tach ratio range by switch 54, the engine is run to the desired r.p.m. and the percent r.p.m. switch 52 is set to bracket the actual engine speed.

In operation, the machine under analysis, 13, whose tachometer 22 is connected to a frequency-to-DC converter 40 and whose vibration pickup 12 is connected to the vibration analyzer 11 is generating many frequencies, which can be related to a ratio to the tachometer output thus changing as engine speed changes. Initially, the ratio sweep set switch 54 is set to the desired sweep ratio $R$ which will cause the system to sweep from $R$ to $R/10$. In addition, the r.p.m. set switch 52 selects a value of $R_3$ such that the output $e_1$ of the summing amplifier 41 is an error voltage proportional to the difference between the set r.p.m. and the actual r.p.m. Resistors $R_1$, $R_2$, $R_3$, $R_4$ and the voltage source $V_2$ provide this computation. The error voltage $e_1$ is applied to the resistive slide wire $R_5$ of the potentiometer 35 such that the output of the wiper 36 is proportional to the position of the recording pen on the X-axis. This voltage $e_2$ is summed via resistor $R_6$ with a linear sweep voltage generated by the sweep generator 33 via resistor $R_7$. The sum thereof is converted to a frequency $f_0$, in the DC-to-frequency converter 44. The sweep source 33 is also connected directly to drive the X-axis drive 34. The output of the DC-to-frequency converter 44 is proportional to the sum of the sweep voltage and an r.p.m. error voltage multiplied by the wiper 36 position.

The variable frequency divider 17 divides the signal $f_o$ in accordance with the set ratio $\circledR$ of the ratio set knob 20 or 42. The output frequency from the divider 17 is used as a reference to the modulators 14 and 15 which are also responsive to the input frequency $F_m$ from the vibration pickup 12.

Assume that the engine is running at the reference r.p.m. $S_n$, such that $e_1=0$. The sweep voltage will now cause $f_o$ to sweep from $f1$ to $0.1f1$ which causes the modulator reference to sweep from $\frac{f1}{\circledR}$ to $\frac{.1f1}{\circledR}$. Assume that $F_m = \frac{.5f1}{\circledR}$, thus causing peak at $X=5$ inches. Now assume the engine changes its speed to a new r.p.m. $S_2$, greater than $S_n$ causing $e_1$ to be proportional to $S_2-S_n/S_n$ and also causing $F_m$ to shift to $F_m' = \left(\frac{.5f1}{\circledR}\right)\left(\frac{S2}{Sn}\right)$ which with respect to an uncompensated system would cause the peak to shift to the right. However, the error voltage $e_1$, after multiplication by the X-axis position in the slide wire, is added to the sweep voltage to correct for the engine speed shift. This correction is adjusted such that $f_o$ is to $f_o'=f_o(S_2/S_n)$ causing a higher frequency to be connected to the modulators 14 and 15 which causes the peak to again occur at the proper place on the X-axis.

Figure 4:
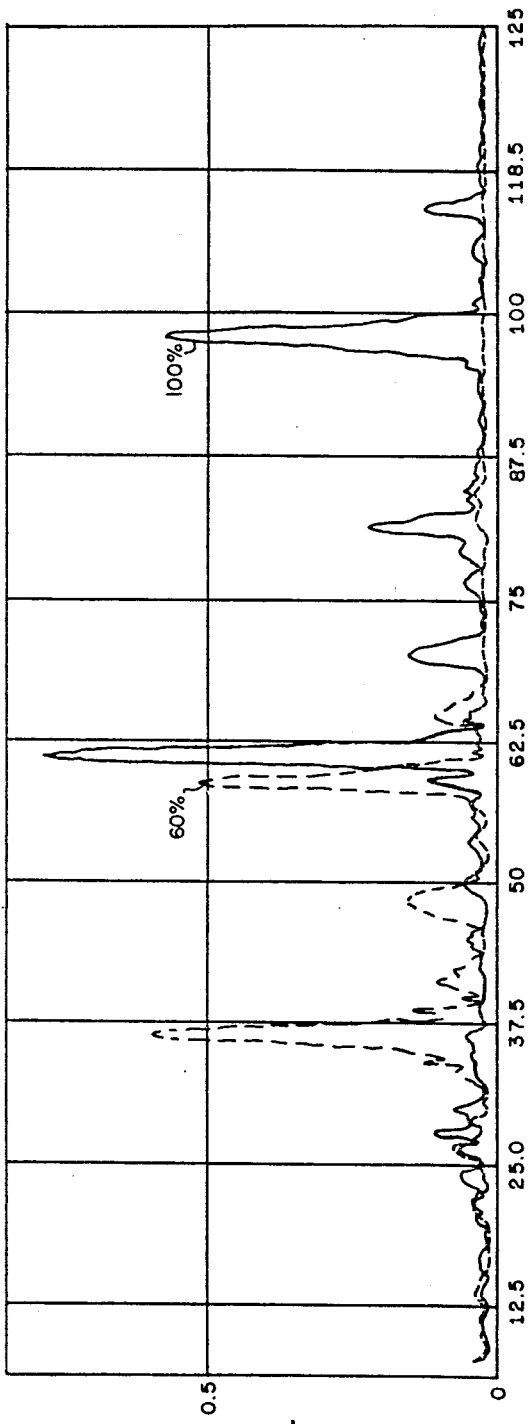
FIG. 4 is a graph of vibration amplitude versus tach ratio frequency for 60 percent and 100 percent r.p.m. which shows the X-axis shift in the absence of the present invention.
Figure 5:
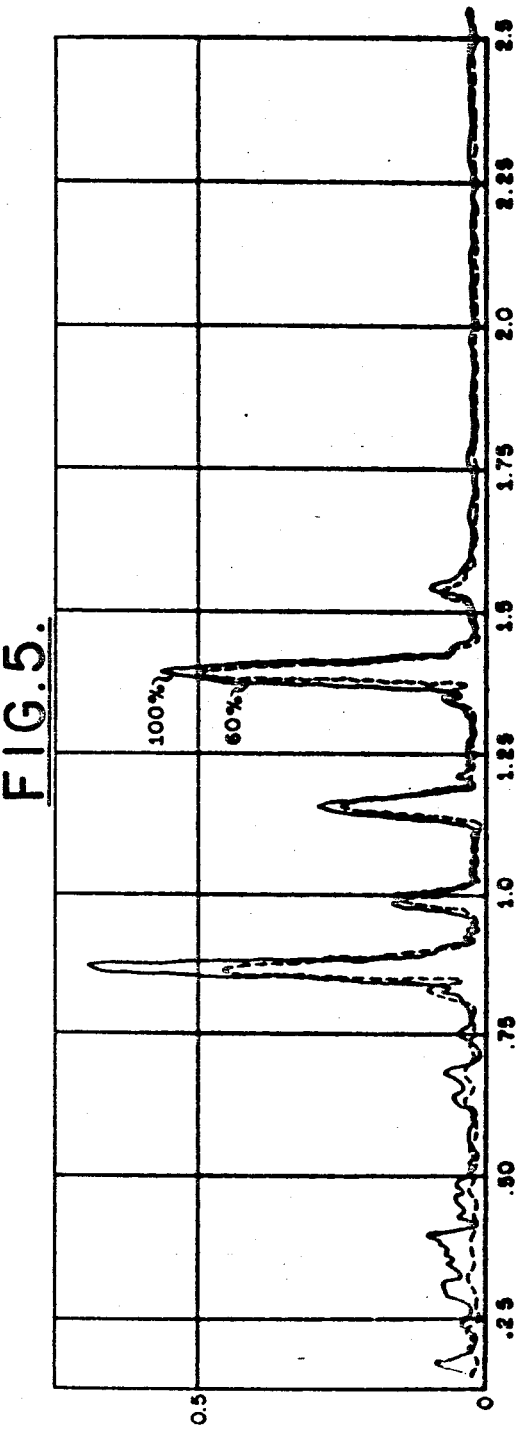
FIG. 5 is a similar graph of vibration amplitude versus tach ratio for 60 percent and 100 percent r.p.m. which shows the superposition of the respective peaks utilizing the present invention.

FIG. 4 is a tach ratio frequency plot for 60 percent and 100 percent r.p.m. which shows the X-axis shift in the absence of the present invention. FIG. 5 shows two 0.25-2.5 overlaid tach ratio plots at 100 percent and 60 percent r.p.m. which shows no X-axis shift for simplified analysis in accordance with the present invention.

While the invention has been described in its preferred embodiment, it is to be understood that the words which have been used are words of description rather than limitation and that changes within the purview of the appended claims may be made without departing from the true scope and spirit of the invention in its broader aspects.

1. A vibration resolver for indicating the vibration characteristics of rotating equipment having a multiplicity of interconnected component parts having different rotational frequencies but bearing respective unique ratios determined by fixed gear ratios relative to the rotation frequency of a predetermined one of said component parts irrespective of the speed of rotation of said equipment, comprising
   a. vibration pickup means coupled with said equipment for providing a multiple-frequency signal output corresponding to the rotational frequencies of said component parts, said frequencies varying in response to changes in speed of said equipment,
   b. sweep voltage means for providing a variable-magnitude sweep voltage signal,
   c. means coupled to said sweep voltage means for controlling the location of a gear ratio indication on a visual display of gear ratio versus amplitude,
   d. means coupled to said rotating predetermined one of said component parts, to said sweep voltage means and said gear ratio locating means for providing a reference frequency signal,
   e. means responsive to said reference frequency signal for providing a control frequency signal proportional to the ratio of said reference frequency to a band of frequencies including the frequencies of a plurality of said component parts to be indicated,
   f. means for modulating said multiple frequency signal with said control frequency signal for providing a normalized amplitude signal representative of the vibration characteristics of each of said plurality of parts, having a peak amplitude only when said multiple-frequency signal is equal in frequency to said control frequency signal, and
   g. means coupled to said modulating means for providing a normalized amplitude indication and coacting with said gear ratio-locating means to produce an amplitude vs. gear ratio indication of the magnitude of vibration of each of said plurality of parts over the speed range of said equipment whereby a peak amplitude for said predetermined one of said component parts always occurs at the same gear ratio location on the resulting indication regardless of speed changes of the equipment being analyzed.

2. A vibration resolver of the character recited in claim 1 in which said means for controlling the location of a gear ratio indication includes an X-axis drive means responsive to said sweep voltage signal.

3. A vibration resolver of the character recited in claim 1 in which said means for providing a reference frequency signal includes
   a. means deriving a signal proportional to the error between the actual engine speed and a predetermined reference engine speed,
   b. means for providing a signal equal to the product of said error signal and a variable impedance coupled to said sweep voltage means, and
   c. means for varying said reference frequency signal in response to the algebraic sum of said sweep signal and said product signal.

4. A vibration resolver of the character recited in claim 6 in which said means for providing an amplitude indication includes Y-axis drive means responsive to said normalized amplitude signal.

5. A vibration resolver of the character recited in claim 2 in which said means for providing a product signal includes a variable impedance responsive to said error signal and to said location of said gear ratio indication for providing said product signal.

6. A vibration resolver of the character recited in claim 5 in which said multiplying means includes potentiometer means having a resistive winding energized by said error signal and a wiper arm positionable in response to said sweep signal for providing said product signal.